INVENTOR
HAROLD W. VOORHIS
BY
Mason, Porter, Diller & Stewart
ATTORNEY

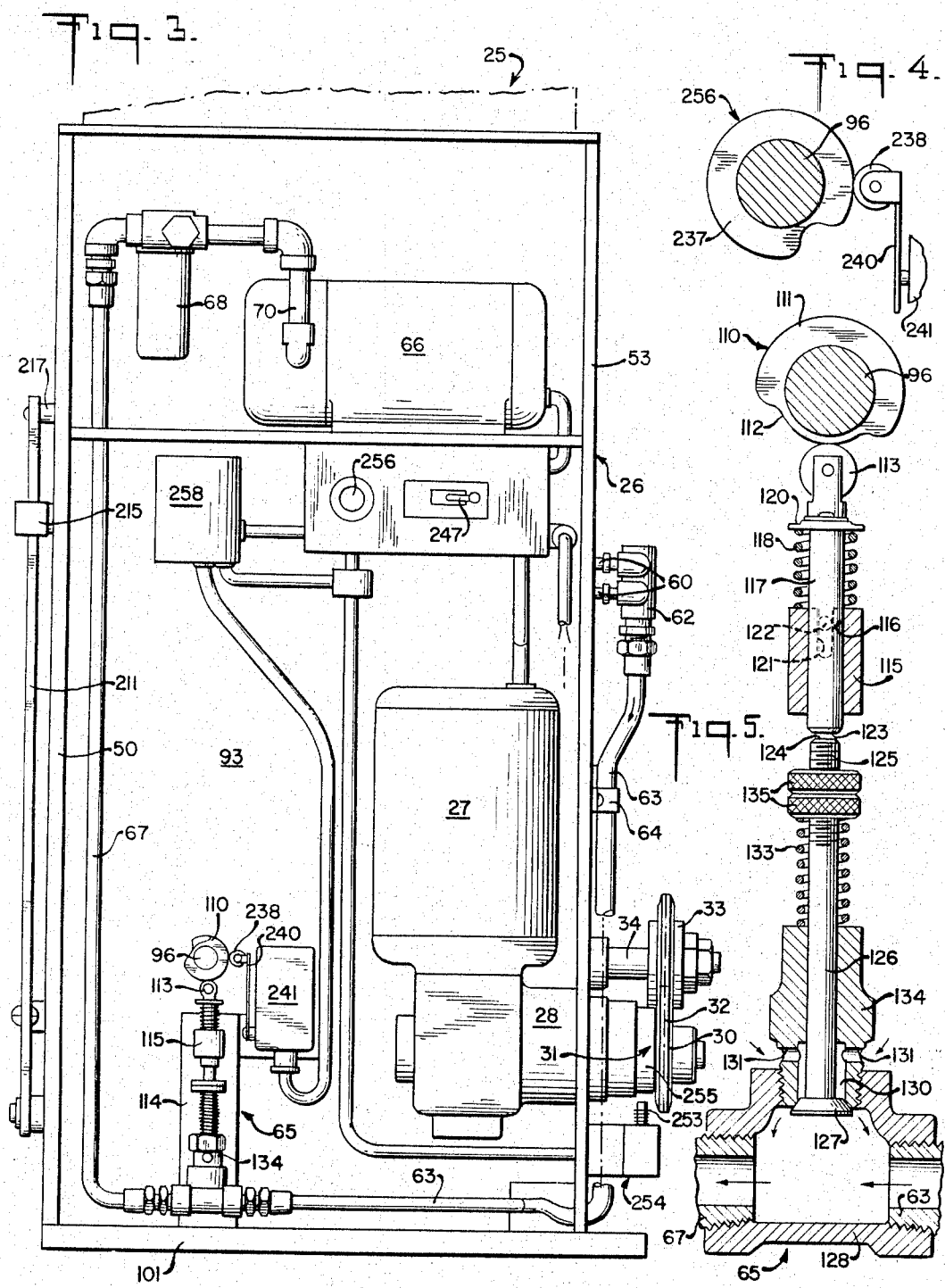

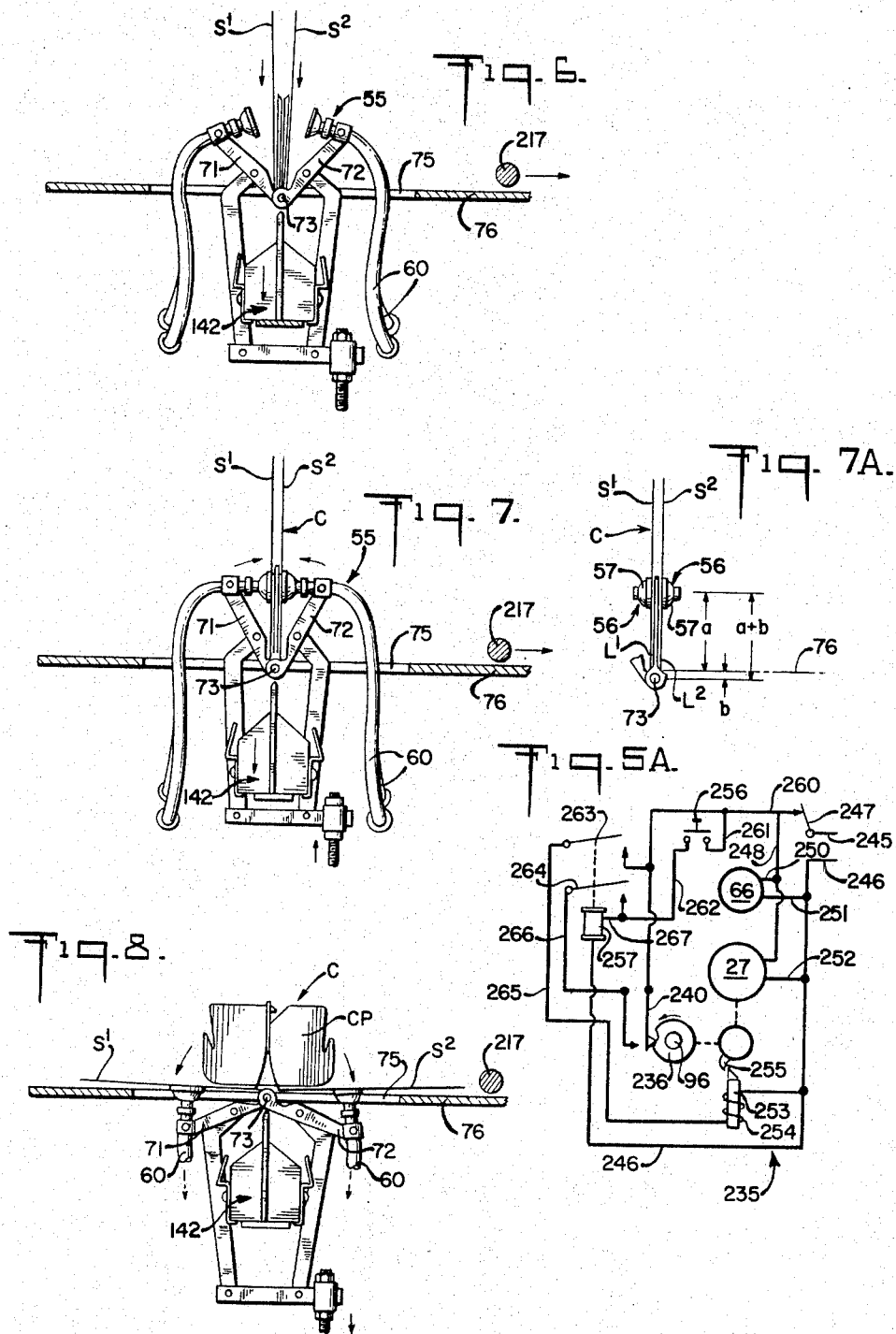

Sept. 19, 1967 H. W. VOORHIS 3,342,112
EGG CARTON SETTING-UP MACHINE
Filed Nov. 20, 1964 12 Sheets-Sheet 5
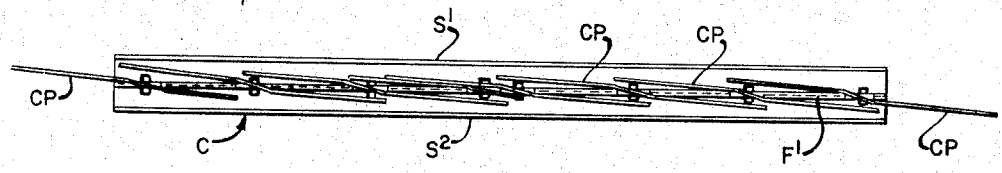
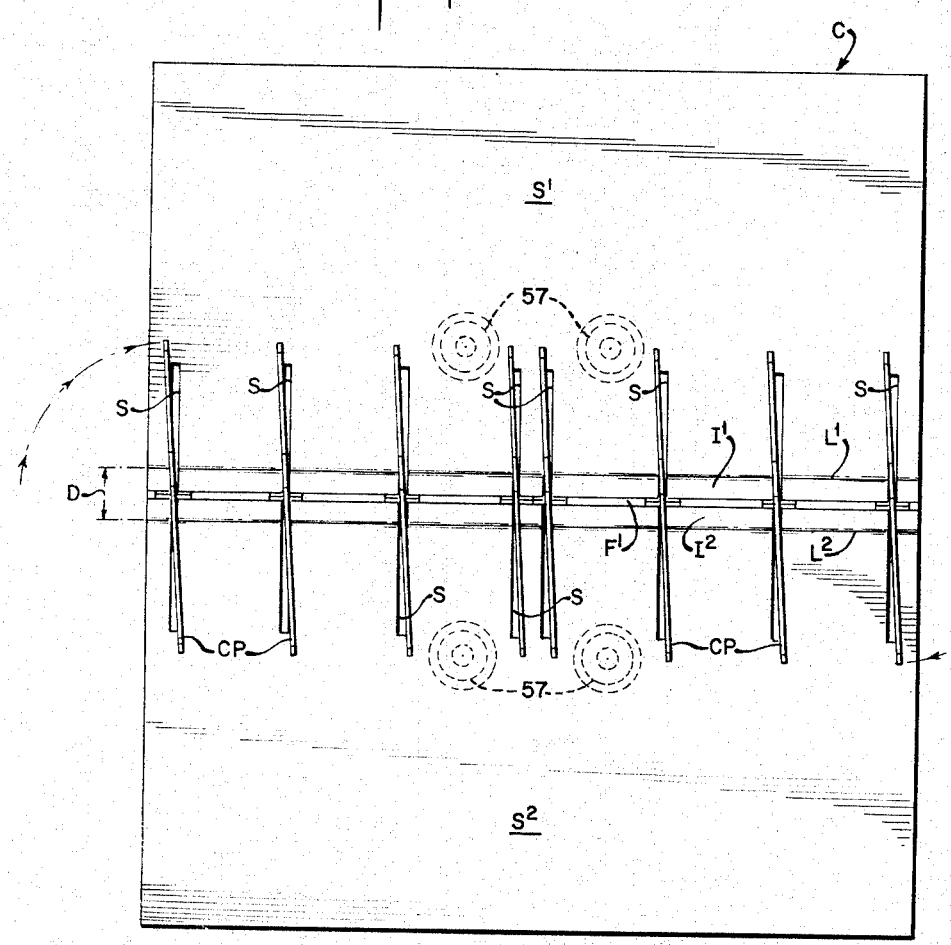
INVENTOR.
HAROLD W. VOORHIS
BY
ATTORNEY

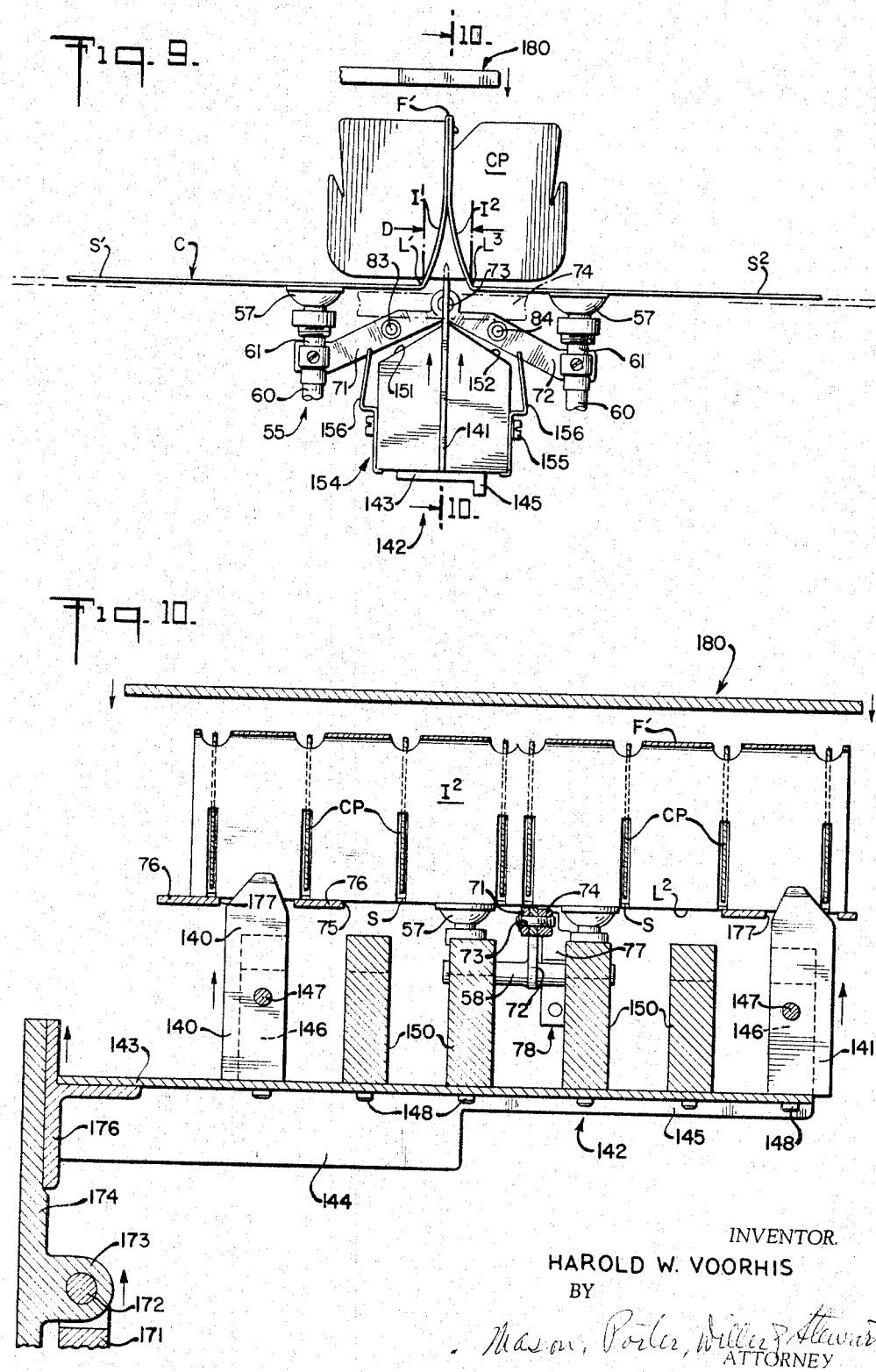

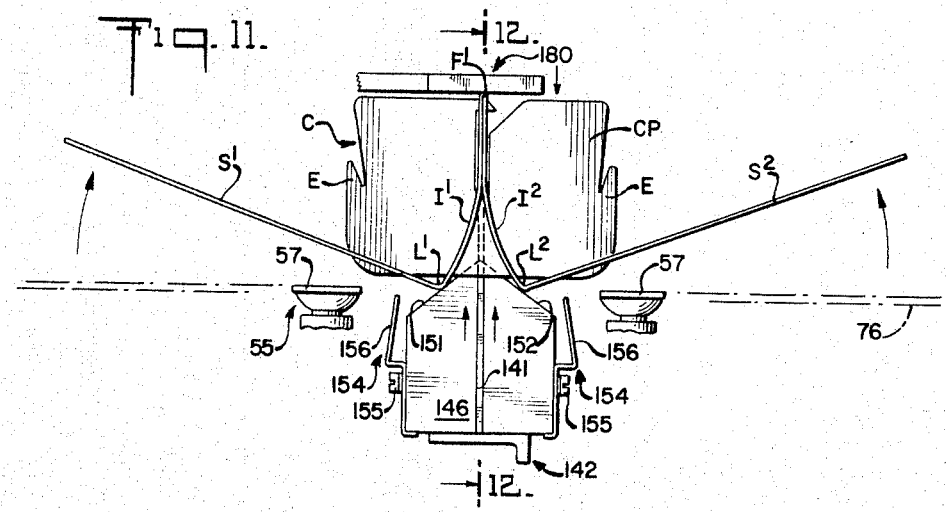
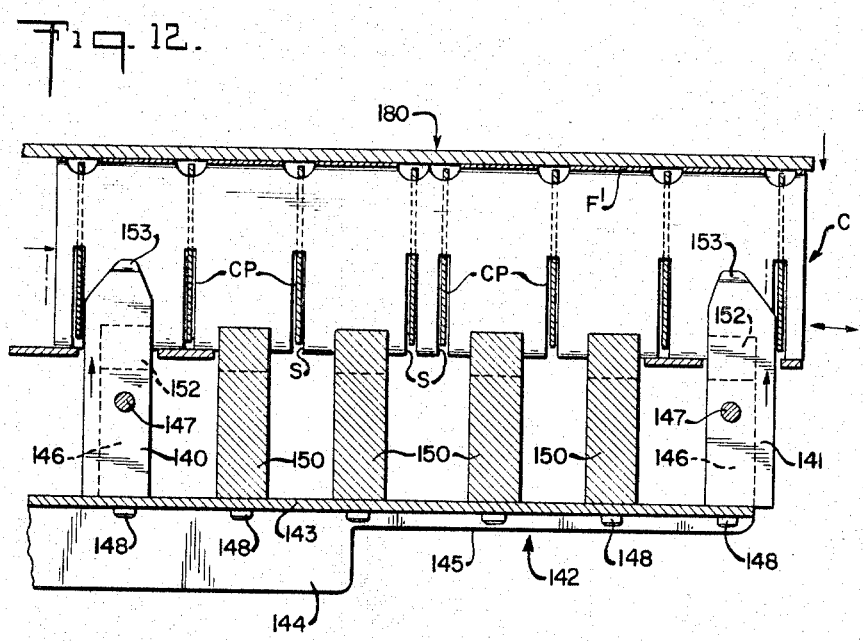

Sept. 19, 1967  H. W. VOORHIS  3,342,112
EGG CARTON SETTING-UP MACHINE
Filed Nov. 20, 1964  12 Sheets-Sheet 8

INVENTOR.
HAROLD W. VOORHIS
BY
Mason, Porter, Diller & Stewart
ATTORNEY

Sept. 19, 1967     H. W. VOORHIS     3,342,112

EGG CARTON SETTING-UP MACHINE

Filed Nov. 20, 1964     10 Sheets-Sheet 9

INVENTOR.
HAROLD W. VOORHIS
BY
ATTORNEY

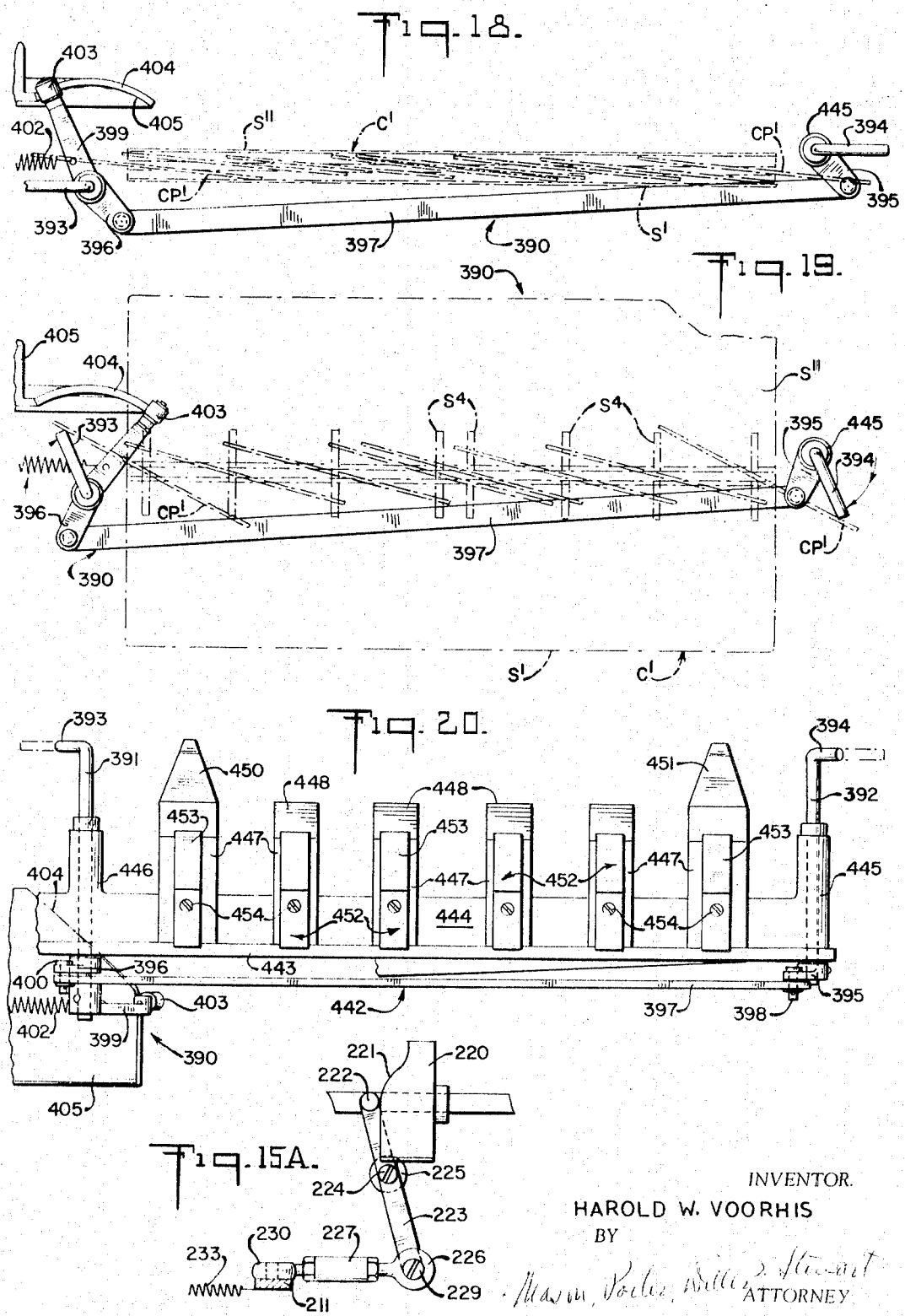

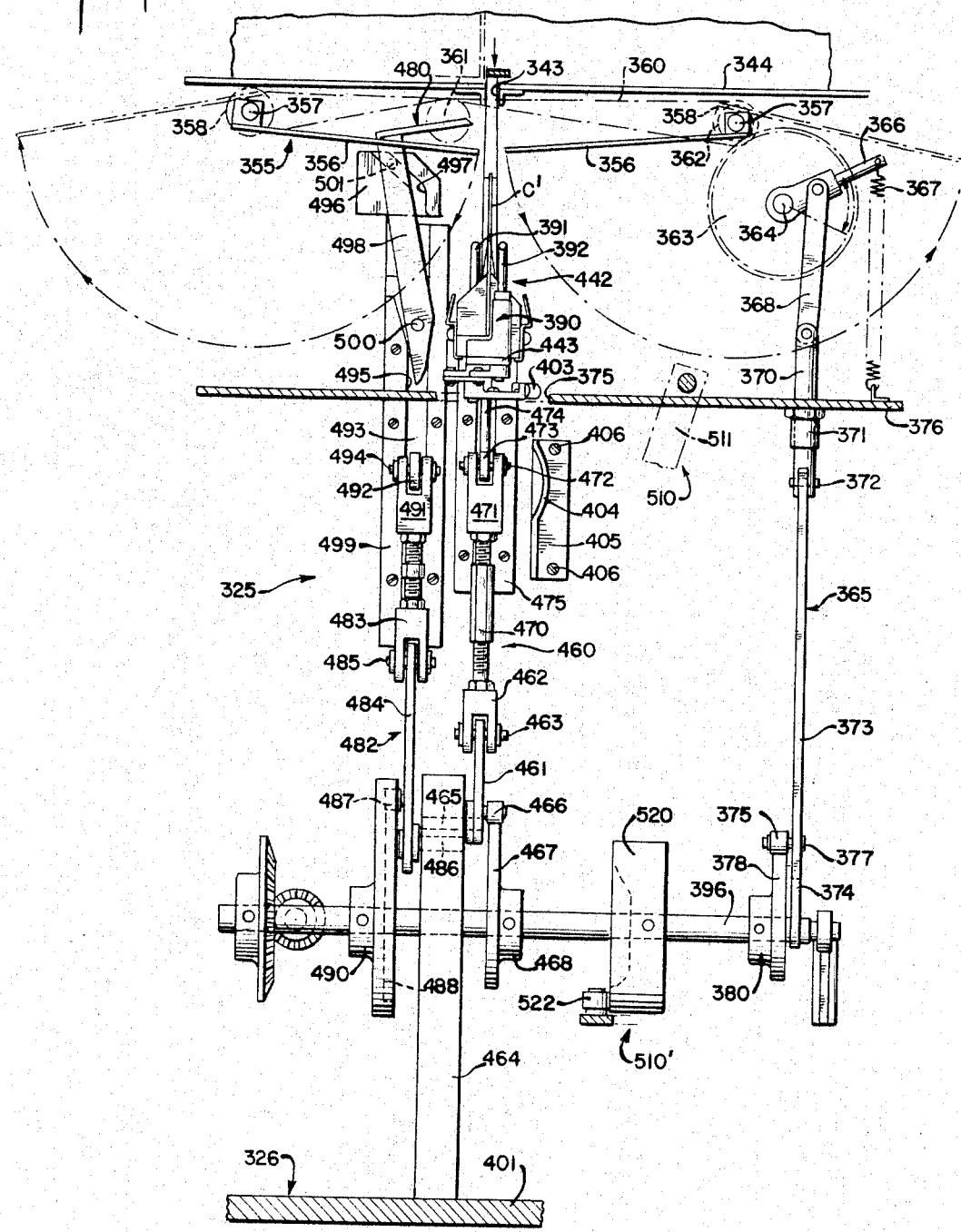

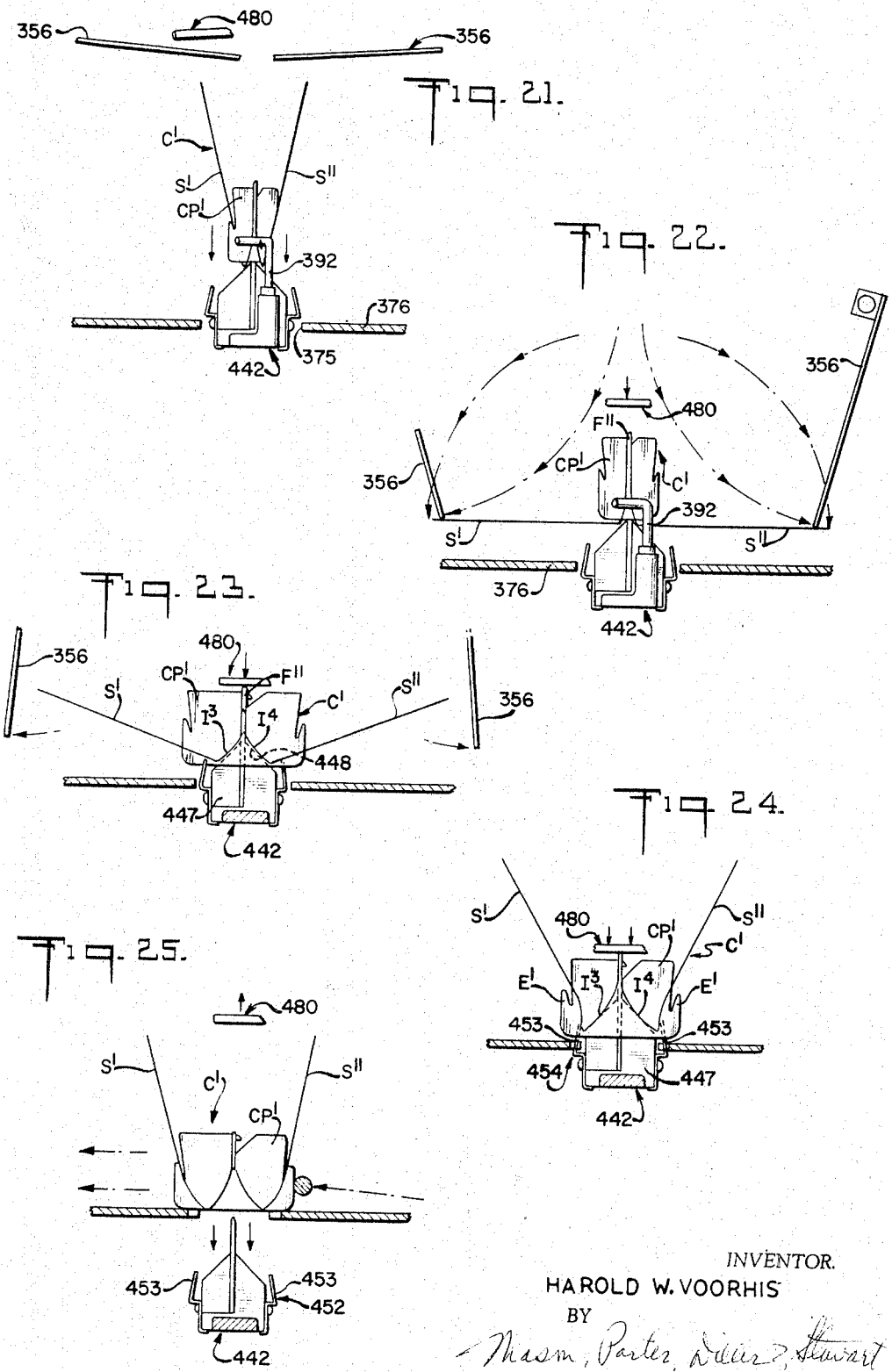

United States Patent Office 3,342,112
Patented Sept. 19, 1967

3,342,112
EGG CARTON SETTING-UP MACHINE
Harold W. Voorhis, Upper Nyack, N.Y., assignor to Continental Can Company, Inc., New York, N.Y., a corporation of New York
Filed Nov. 20, 1964, Ser. No. 412,659
26 Claims. (Cl. 93—37)

This invention relates to a novel apparatus for erecting folded cartons, such as egg cartons, by the automatic performance of a series of folding operations.

In conventional erecting machines a folded carton blank is fed downwardly toward an upper ridge of a mandrel which has sloping surfaces and upwardly directed blade members. The carton is impaled on the blade members and intermediate fold lines thereof rest against the upper ridge of the mandrel.

Means outwardly fold outer side walls of the carton about the intermediate fold lines causing cross partitions of the carton to be released from their normal position of restraint between the outer side walls of the carton.

Means then urge the carton downwardly against the sloping surfaces of the mandrel which force the inner side walls of the carton to become separated. During this separation the cross partitions become substantialy aligned with slots in the walls of the carton.

Both the mandrel and the means for urging the carton against the mandrel, generally a pressure plate, move downwardly simultaneously causing the outer side walls of the carton to bear against folding bars which fold the outer side walls inwardly toward each other and bring the slots thereof into registration with the cross partitions. During this downward movement of the mandrel and the pressure plate, the carton is supported upon a spring biased platform which bears against the cross partitions and is urged downwardly against the bias of the springs as the pressure plate and mandrel descend. After bottoming, the mandrel, pressure plate and the platform move upwardly. During this upward movement, the outer side walls of the carton bear against the folding bars and are thus urged outwardly into the interlocking engagement with ear portions of the cross partitions. At this point the carton is completely erected and is thereafter withdrawn from the platform to an exit station of the machine.

The above described conventional carton erecting machine has various disadvantages, a major one of which is the intricate relative movement between the pressure plate, mandrel, platform, and folder bars to interlock the outer side walls with the cross partitions.

Another inherent disadvantage in conventional prior art erecting machines is the inaccuracy of feed of a carton toward and upon the mandrel and the improper entry or non-entry of the blade members or "picks" between the inner side walls of the carton.

During the initial outward folding of the outer side walls above-mentioned, a pair of parting arms swing outwardly and contact the outer side walls urging the same to a substantially flat position. This contact occurs at a time when the carton is merely supported by the blade members of the mandrel, and the non-positive contact between the arms and the outer side walls of the carton tend to dislodge or misalign an improperly impaled carton.

In keeping with the above, it is an object of this invention to provide a novel apparatus for erecting a folded carton of the type described by positively gripping the outer side walls of the carton during the initial unfolding thereof, eliminating the complex apparatus for interlocking the outer side walls and the cross partitions, and insuring accurate guiding of the cartons upon each of the blade members to assure the proper impalement thereof with an associated carton thereby substantially eliminating the heretofore mentioned inherent disadvantages in conventional prior art erecting machines.

A further object of this invention is to provide a novel apparatus for erecting cartons including means for feeding a folded carton along a predetermined path, means for grasping and separating outer side walls of the carton whereby inner side walls of the carton are separated and cross partitions of the carton are repositioned with respect to the inner and outer side walls, means for further separating the inner side walls and clip means for yieldingly urging the outer side walls into interlocking engagement with the cross partitions during movement of the mandrel upon which the carton is supported.

A further object of this invention is to provide a novel apparatus for erecting cartons of the type immediately above described in which the grasping and separating means are vacuum means movable toward each other for grasping the outer side walls of the carton and movable away from the predetermined path to unfold the outer side walls to a generally flat position prior to the further separation of the inner side walls and the interlocking engagement between the outer side walls and the cross partitions.

A further object of this invention is to provide a novel apparatus as above defined including guide means comprising at least a pair of members straddling the predetermined path along which the folded cartons are fed, the members each having guiding surfaces opposing one another and converging in the direction of carton feed whereby folded cartons are accurately positioned prior to and during the erection thereof.

A further object of this invention is to provide a novel apparatus for erecting cartons of the type which are fed in folded form and include inner side walls extending from a center fold line to intermediate fold lines, outer side walls extending from the intermediate fold lines over the inner side walls, the inner and outer side walls containing registering transverse slots and cross partitions hinged in the slots of the inner side walls and lying flat between the inner and outer side walls when the carton is folded, the apparatus including means for separating the outer side walls of the carton by engagement with at least two of the cross partitions, the means being a pair of pivotable members, the members having offset portions swingable toward each other and against endmost ones of the cross partitions whereby the outer side walls are separated upon the pivoting of at least some of the cross partitions.

With the above and other objects in view that will hereinafter appear the nature of the invention will be more clearly understood by reference to the following detailed description, the appended claims and the several views illustrated in the accompanying drawing:

In the drawings:

FIGURE 3 is a side elevational view taken along line 3—3 of FIGURE 1 and discloses a cam actuated valve mechanism for sequentially energizing and de-energizing the pivotable vacuum members of FIGURE 1.

FIGURE 4 is an enlarged fragmentary view of a switching cam forming a portion of the vacuum mechanism of FIGURE 3.

FIGURE 5 is an enlarged longitudinal sectional view of the vacuum mechanism of FIGURE 3, and shows a vacuum cam contacting one of a pair of spring biased valve actuating stems of the valve mechanism.

FIGURE 5A appearing on the sheet embodying FIGURES 6, 7, 7A and 8 is a schematic view of a system for controlling the carton erecting machine.

FIGURE 6 is a schematic front view of the carton erecting machine of this invention, and illustrates a folded carton fed between a pair of pivotable vacuum members and a mandrel having upwardly projecting blades positioned below the carton.

FIGURE 6A appearing on the sheet embodying FIGURE 8A is an enlarged top plan view of the folded carton of FIGURE 6 and illustrates the generally planar alignment of a plurality of cross partitions hinged to inner side walls of the carton and restrained between outer side walls of the carton.

FIGURE 7 is a schematic view of the carton erecting machine and illustrates the pivotable grasping members contacting the outer side walls of the folded carton prior to the unfolding thereof.

FIGURE 7A is a schematic view of portions of the grasping members and the folded carton, and illustrates the dimensional relationship therebetween which causes an initial separation of the inner side walls upon the unfolding of the outer side walls.

FIGURE 8 is a schematic view of the erecting machine of this invention, and illustrates the outer side walls completely unfolded and the repositioning of the cross partitions by the initial spreading of the inner side walls of the carton.

FIGURE 8A appearing on the sheet embodying FIGURE 6A is an enlarged top plan view of the carton of FIGURE 8, and illustrates the same in a generally unfolded condition with the cross partitions normal to central and intermediate fold lines of the carton.

FIGURE 9 is a front elevational view of the vacuum grasping members, the mandrel and the pressure plate, and illustrates the partial insertion of the blade members carried by the mandrel between the inner side walls of the carton and the descent of the pressure plate.

FIGURE 10 is a sectional view taken along line 10—10 of FIGURE 9, and more clearly illustrates the partial insertion of the blade members of the mandrel between the inner side walls of the carton.

FIGURE 11 is an end elevational view similar to FIGURE 9 of the drawings, and illustrates the mandrel advancing upwardly and the pressure plate preventing upward movement of the carton during the infolding of the outer carton side walls.

FIGURE 12 is a longitudinal sectional view taken along line 12—12 of FIGURE 11 and more clearly illustrates the infolding of the outer side walls of the carton.

Figure 13:
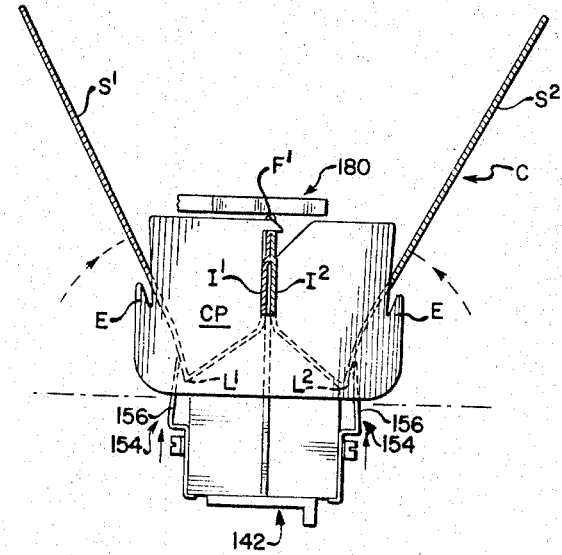

FIGURE 13 is an end elevational view of the elements of FIGURES 9 and 11, and illustrates clips carried by the mandrel urging lower portions of the outer side walls adjacent the intermediate fold lines inwardly to bring portions of the cross partitions into engagement with slots formed in the inner and outer side walls of the carton.

Figure 14:
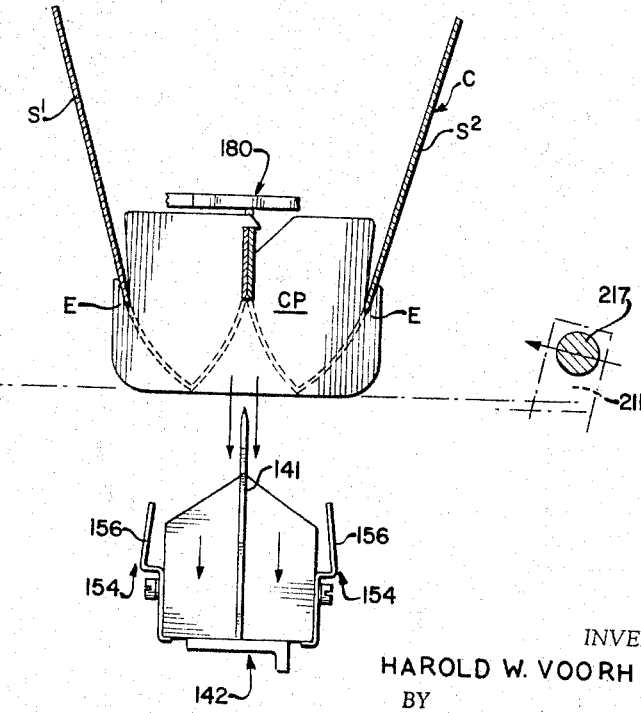

FIGURE 14 is a schematic elevational view similar to FIGURE 13, and illustrates the downward retraction of the mandrel and the interlocking of the outer carton side walls with ears of the cross partitions.

Figure 15:
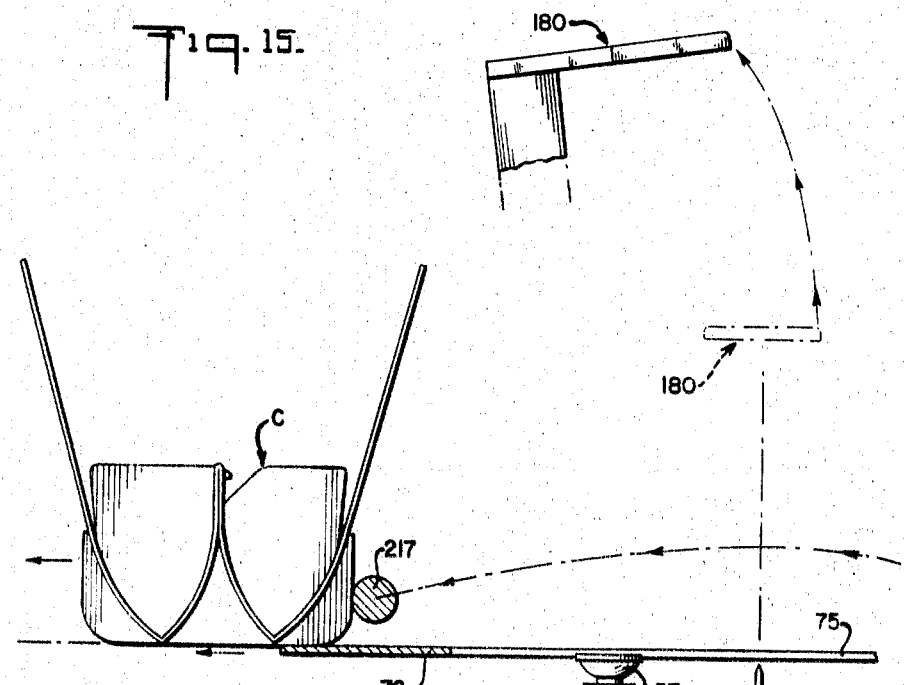

FIGURE 15 is a schematic end elevational view of the erecting machine, and illustrates the release of the carton by the pressure plate and the discharge of the now erected carton from the erecting machine of this invention.

Figure 1:
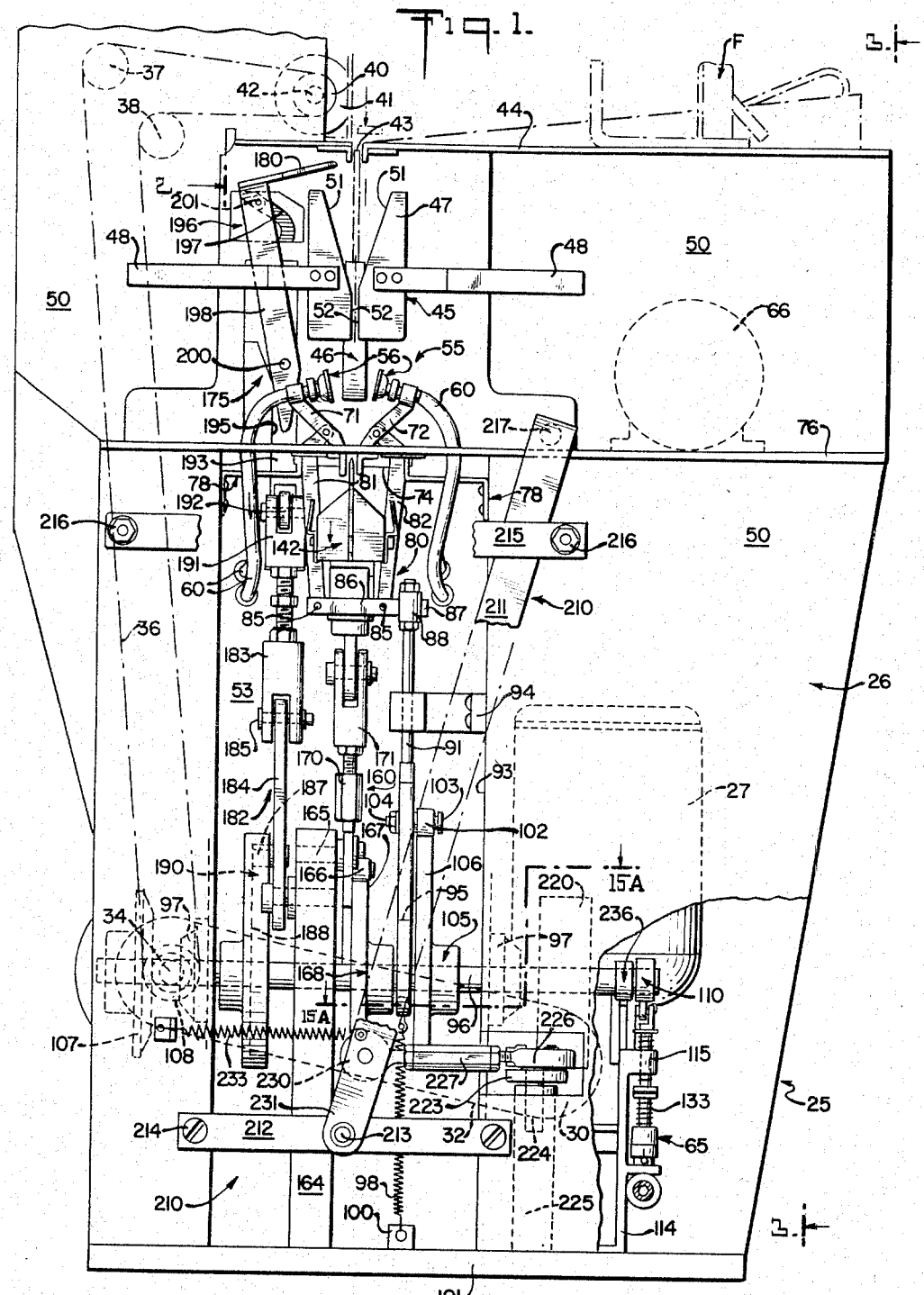
FIGURE 1 is a front elevational view of the novel carton erecting apparatus or machine of this invention, and illustrates pivotable vacuum members for grasping outer side walls of folded cartons as the same are fed downwardly between opposed guide members.

FIGURE 15A appearing on the sheet embodying FIGURES 18, 19 and 20 is a fragmentary view taken along line 15A—15A of FIGURE 1, and illustrates a linkage of a cam actuated carton discharge mechanism of the carton erecting machine.

Figure 16:
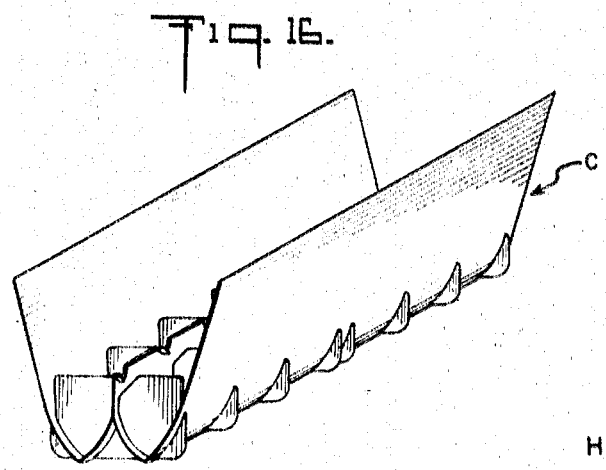

FIGURE 16 is a top perspective view of the finally erected carton of this invention, and illustrates the cross partitions interlocked with the outer side walls of the carton.

FIGURE 17 is a fragmentary partially schematic end view of another novel erecting machine constructed in accordance with this invention, and illustrates various control mechanisms for operating various mechanisms of the machine.

FIGURE 18 is an enlarged top plan view of a mechanism carried by a mandrel of the erecting machine of FIGURE 17, and illustrates a pair of pivotable members prior to the pivoting thereof to infold a carton supported by the mandrel.

FIGURE 19 is a top plan view of the mechanism of FIGURE 18 with the carton illustrated partially unfolded in phantom outline, and shows offset portions of the pivotable members bearing against endmost cross partitions of the carton to thereby cause the unfolding thereof.

FIGURE 20 is a side elevational view of the mandrel and pivoting members of FIGURES 18 and 19 and more clearly illustrates a linkage and cam mechanism for operating the same.

FIGURE 21 is a schematic end view of the mandrel and a pair of unfolding arms of the erecting machine shown in FIGURE 17, and illustrates one of the pivotable members bearing against a cross partition to initiate the unfolding of a carton seated upon the mandrel.

FIGURE 22 is a schematic end view of the erecting machine, and illustrates outermost side walls of the carton completely unfolded.

FIGURE 23 is a schematic end view of the erecting machine, and illustrates the carton being grasped between a pressure plate and the mandrel whereby inward folding of the outer side walls is initiated.

FIGURE 24 is a schematic end view of the erecting machine and shows a plurality of clips carried by the mandrel urging lowermost portions of the outer side walls inwardly to register slots therein with the cross partitions.

FIGURE 25 is a schematic end view showing the machine at the termination of the erecting operation and illustrates the withdrawal of the pressure plate, mandrel and the beginning of the ejection of the erected carton from the erecting machine.

Figure 2:
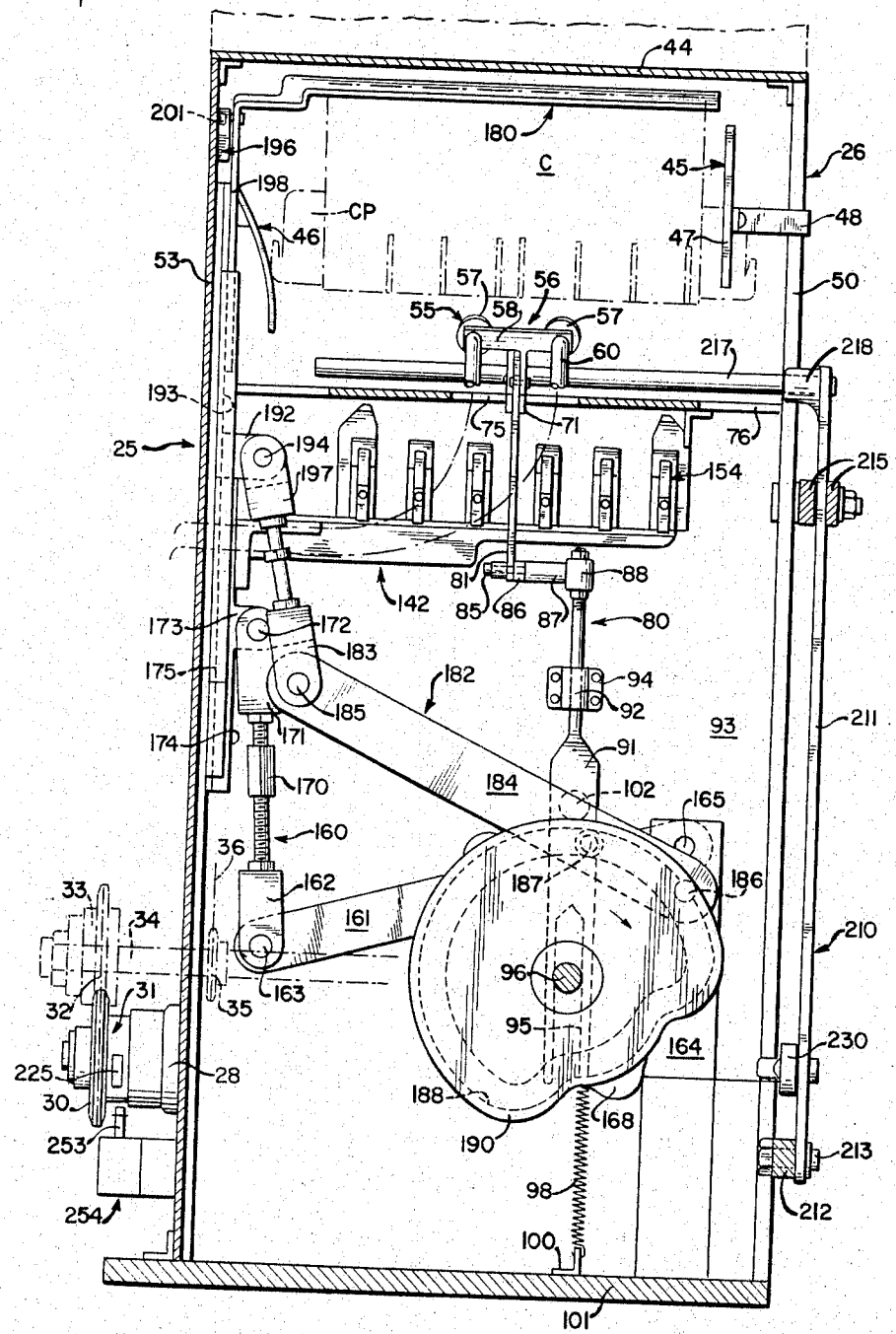
FIGURE 2 is a sectional view taken along line 2—2 of FIGURE 1, and illustrates connecting linkages for actuating a movable mandrel and pressure plate of the carton erecting machine.

Referring to FIGURES 1 through 3 of the drawings, a novel carton erecting machine or apparatus of this invention is generally referred to by the reference numeral 25.

The carton erecting machine 25 comprises a base or framework 26 to which is secured a conventional electric motor 27 (FIGURE 3) having a right-angle drive 28. A shaft (not shown) of the right-angle drive 28 drives a sprocket 30 through a clutch 31. A drive chain 32 (FIGURE 1) is entrained about the sprocket 30 and a sprocket 33 (FIGURE 2) keyed to a cross shaft 34 which is in turn suitably conventional journalled in the framework 26 of the carton erecting machine 25.

A pulley 35 (FIGURE 2) is keyed on the cross shaft 34. A pulley belt 36 (FIGURES 1 and 2) is entrained about the pulley 35, a pair of pulleys 37, 38 (FIGURE 1) and a pulley 40 of a feed wheel 41 carried by a shaft 42 which is conventionally journalled in the framework 26 of the erecting machine 25. The belt 36 drives the feed wheel 41 in a clockwise direction as viewed in FIGURE 1 of the drawings to feed a folded carton downwardly through an opening or throat 43 in an upper plate 44 of the framework 26. A conventional feeder F urges a plurality of folded cartons from right-to-left as viewed in FIGURE 1 of the drawings, and a leading one of the folded cartons C (FIGURE 2) is fed downwardly along a generally vertical predetermined path toward a plurality of guide means 45 and 46.

The guide means 45 includes an identical member 47 supported on each side of the predetermined path by an identical bracket 48 welded or otherwise conventionally secured to a vertical panel or wall 50 (FIGURE 2) of the framework 26. Uppermost identical surfaces 51 of each of the members 47 converge downwardly in a direction of carton travel along the predetermined path and gradually blend or merge in identical opposed parallel surfaces 52 defining a gap (unnumbered) therebetween.

The guide means 46 (FIGURE 2) is a flexible metallic element secured at one end thereof to a vertical panel or wall 53. The guide means 46 engages an endmost one of a plurality of cross partitions CP of the carton C in a manner clearly illustrated in FIGURE 2 of the drawings to guide the folded carton C in cooperation with the guide means 45 toward means 55 (FIGURES 1 and 2) for grasping and separating the folded carton.

The means 55 are a pair of substantially identical vacuum members 56 positioned on opposite sides of the predetermined path of travel of the folded cartons. Each of the vacuum means 56 includes a pair of cup members 57 secured to opposite end portions of a bar 58 (FIGURES 2 and 10). Identical hoses or conduits 60 are secured to a stem 61 (FIGURE 9) of each of the cup members 57. The hoses 60 pass through openings (unnumbered) in the panel 53 (FIGURES 1 and 2) and are connected by a coupling 62 to a pipe 63 supported on the exterior of the panel 53 by a plurality of brackets 64 (only one of which is illustrated in FIGURE 3 of the drawings). The pipe 63 passes through a lower opening (unnumbered) in the panel 53 and is connected to a valve mechanism 65, the structure and function of which will be described fully hereafter.

The valve mechanism 65 is in turn placed in fluid communication with a vacuum pump 66 (FIGURE 3) by another pipe or conduit 67, a filter 68 and a conduit 70.

An arm 71 (FIGURES 2 and 9) is secured to one of the bars 58 while another arm 72 (FIGURES 9 and 10) is similarly secured to the other of the bars 58. The arms 71 and 72 are pivotally joined together by a pin 73 (FIGURES 9 and 10) passing through openings (unnumbered) in the ends of the arms 71 and 72, and threaded in an opening (unnumbered) in a support 74 (FIGURES 1, 9 and 10). The support 74 is positioned in a central opening 75 (FIGURE 10) formed in a plate 76 supported between the panels 50 and 53 of the framework 26. As is best illustrated in FIGURE 10 of the drawings, the pivot pin 73 defining the point about which the arms 71 and 72 pivot is positioned below the upper surface (unnumbered) of the plate 76 for a purpose to be described more fully hereafter.

The support 74 is fastened at opposite end portions thereof in a conventional manner to upstanding flanges 77 (FIGURE 1) of each of two identical brackets 78 secured in a conventional manner to the framework 26 of the carton erecting machine 25. Thus, the arms 71 and 72 are supported by the brackets 78 for pivoting movement about the pivot pin 73 between the positions illustrated in FIGURES 6 and 8 of the drawings as will be described more fully hereafter.

A mechanism for moving or pivoting the means 55 is best illustrated in FIGURES 1 and 2 of the drawings and is generally designated by the reference numeral 80. The means 80 comprises an arm 81 and an arm 82 joined by pivot pins 83 and 84 respectively (FIGURE 9), to the respective arms 71 and 72 carrying the vacuum members 57. Lowermost end portions of the arms 81 and 82 are connected by identical conventional fasteners or pins 85 to a leg 86 of a substantially L-shaped bracket whose remaining leg 87 is welded or otherwise conventionally secured to a collar 88 which is axially bored (not shown).

A rod 91 having an upper threaded end portion (unnumbered) is secured in the bore (not shown) of the collar 88 in a conventional manner clearly illustrated in FIGURES 1 and 2 of the drawings. The rod 91 is guided in a sleeve 92 which is supported from a vertical panel 93 by a plurality of conventional fasteners (unnumbered) passing through flanges or feet 94.

A lowermost end portion of the rod 91 is bifurcated (FIGURE 2) and defines a generally elongated slot 95 through which passes a cam shaft 96 suitably journaled by conventional journal or bearing blocks 97 (FIGURE 1) of the framework 26. A spring 98 is secured to the lowermost end portion of the rod 91 by an eye-bolt (unnumbered) and an opposite end of the spring 98 is connected in a conventional manner by a bracket 100 to a base plate 101 of the framework 26. Thus, the spring 98 continually urges the rod 91 downwardly tending to pivot the vacuum members 56 away from the predetermined path of carton travel.

A cam follower or roller 102 (FIGURE 1) is secured to the rod 91 above the slot 95 by a headed bolt 103 passed through an opening (not shown and unnumbered) in the rod 91 and a conventional threaded nut 104 (FIGURE 1).

A cam 105 having a camming surface 106 in engagement with the cam follower 102 is secured to the cam shaft 96 by a key or other conventional securing means (not shown). The cam follower 102 is shown in FIGURE 1 of the drawings as it approaches the highest point of the cam surface 106 during the rotation of the cam 105 during the rotation thereof by the cam shaft 96. As the cam follower 102 reaches the highest point at the high side of the cam 106, the arms 71 and 72 carrying the vacuum members 56 are pivoted from the position illustrated in FIGURES 1 and 6 of the drawings to the position illustrated in FIGURES 7 and 7A at which point outer side walls $S^1$ and $S^2$ are contacted and grasped by the means 55 under the influence of the vacuum pump 66 in a manner to be described hereafter.

The cam shaft 96 is driven or rotated by a connection with the cross shaft 34. This connection includes a beveled gear 107 (FIGURE 1) keyed to the cam shaft 96 in mesh with a beveled gear 108 keyed to the end of the cross shaft 34 remote from the sprocket 33. Thus, with the clutch 31 in engagement the right-angle drive 28 of the main motor 27 rotates the sprocket 30 driving the chain 32 and rotating the sprocket 33 connected to the cross shaft 34. As the cross shaft 34 rotates, the beveled gear 108 in mesh with the beveled gear 107 rotates the latter. The rotation of the gear 107 causes rotation of the cam shaft 96 and the cam 105 keyed thereto. The cam 105 in turn moves the rod 91, thereby actuating the separating means 55 in the manner heretofore described.

The carton C is grasped by the vacuum members or cups 57 when the same are in contact with the outer carton side walls $S^1$ and $S^2$ (FIGURE 7) by the synchronized actuation of the valve mechanism 65 (FIGURES 1, 3 and 5) which places the vacuum pump 66 in fluid communication with the vacuum members 57 over the path of fluid flow heretofore traced, and closes the valve mechanisms 65 to atmosphere. This synchronized activation of the valve mechanism 65 is accomplished by a valve actuating cam 110 secured to the end portion of the cam shaft 96 opposite the beveled gear 107, as is best illustrated in FIGURE 1 of the drawings.

The cam 110 overlies the valve mechanism 65 (FIGURES 1 and 3) and includes a high side camming surface 111 and a low side camming surface 112. A cam follower or roller 113 (FIGURE 5) is supported beneath and in alignment with the cam 110 by a bracket 114 (FIGURE 1) secured in a conventional manner to the framework 26. The bracket 114 includes a sleeve 115 (FIGURE 5) having a vertical bore 116 into which is reciprocally or slidably received a stem 117. A spring 118 surrounds the stem 117 and is seated between the sleeve 115 and a head 120. The spring 118 biases the cam follower 113 upwardly as viewed in FIGURE 5 of the drawings into contact with the cam 110 in a manner clearly illustrated in this figure. The stem 117 and the cam follower 113 carried thereby are prevented from rotating with respect to the sleeve 115 and are guided during the vertical movement thereof by a vertical slot 121 formed in the sleeve 115 of the bracket 114 (FIGURE 5) and a pin or key 122 secured to the stem 117 and received in the slot 121. A bottom face or end 123 is in opposed axial alignment with a bottom end or face 124 at a threaded end portion 125 of a valve stem 126 of the valve mechanism 65. The valve stem 126 has a valve head 127 normally seated to close the interior of a T-coupling 128 to atmosphere through a chamber 130 and a plurality of radial ports 131 when the cam follower 113 is biased by the spring 117 against the low side 112 of the cam 110. A spring 133 seated between a fitting 134 and a pair of identical knurled nuts 135 threaded on the end portion 125 of the stem 126 normally biases the valve head 127 to the seated position thereof in a manner clearly illustrated in FIGURE 5 of the drawings. In this seated position of the valve seat 127 closing the valve mechanism 65 to atmosphere, air is drawn by the pump 66 over the path of fluid flow heretofore traced to grasp the sides S¹ and S² of the carton C when the cam follower 113 (FIGURE 5) of the valve mechanism 65 is in contact with the low side 112 of the cam 110. However, the high side 111 of the cam 110 urges the cam roller 113 downwardly against the force of the compression spring 118. This brings the bottom end 123 of the stem 117 into bearing contact with the end 124 of the valve stem 126 causing downward movement of the valve stem 126 against the bias of the spring 133 to open the valve mechanism 65 to atmosphere through the chamber 130 and ports 131. This opening takes place after the sides S¹ and S² of the carton C have been unfolded to the general planar positions thereof illustrated in FIGURES 8 and 8A of the drawings. The grasping means 55 thus pneumatically grip the side walls S¹ and S² between the positions of the arms 71 and 72 shown in FIGURES 7 and 8 of the drawings causing an unfolding of the outer side walls S¹, S² about respective intermediate fold lines L¹, L² respectively (FIGURE 8A). This unfolding of the outer side walls S¹ and S² also initiates a partial unfolding of inner side walls or panels I¹ and I² between the respective intermediate fold lines L¹ and L² and a central longitudinal fold line F¹ (FIGURE 8A and FIGURE 9).

During this unfolding of the side walls S¹ and S², I¹ and I² the cross partitions CP swing from a position of confinement between the outer side walls S¹ and S² as shown in FIGURE 6A to the position shown in FIGURES 8A and 9 wherein each of the cross partitions CP is substantially aligned with a single slot S of a plurality of such slots formed in both the outer side walls S¹ and S² and the inner side walls I¹ and I² of the carton C.

The inner side walls I¹ and I² are initially separated a distance D (FIGURES 8A and 9) because of the positioning of the pivot pin 73 joining the arms 71 and 72 beneath the upper surface of the plate 76 upon which the carton C is supported during the unfolding thereof, as will be best understood by referring to FIGURES 7 and 7A of the drawings. Each of the vacuum members or vacuum cups 57 contact the outer side walls S¹, S² of the carton C at a center-to-center distance ($a$) from the intermediate fold lines L¹, L² supported by the upper surface (unnumbered) of the plate 76. The pivot pin 73 is spaced a distance ($b$) from its axis to the intermediate fold lines L¹, L². Thus, the center-to-center distance between the pivot pin 73 and the vacuum members 57 is the sum of the distances ($a$) or ($a+b$). In the fully unfolded position of the walls S¹ and S² the differences in twice these distances ($a$ and $a+b$) is slightly greater than the distance D of initial separation between the lines L¹, L² or as stated another way, the distance of initial separation D of the inner walls I¹ and I² at the intermediate fold lines L¹, L² is slightly less than twice the distance ($b$).

The reason for initially separating the inner walls I¹ and I² of the carton C is to facilitate the further separation and erection of the carton C by the introduction between these inner walls of a plurality of blade members or "picks" 140, 141 (FIGURES 10 and 11) carried by a vertically movable mandrel 142. The mandrel 142 comprises a horizontal plate 143 and a depending flange 144 which is recessed at 145 to prevent interference between the mechanism 80 for actuating the grasping means 55 and the mandrel 142 during the operation of the erecting machine 25. The blade 140 and the blade 141 are each supported between a pair of identical bodies 146 at opposite ends of the mandrel 142 by identical conventional fasteners 147. The bodies 146 are secured to the plate 143 of the mandrel 142 by fasteners 148.

A plurality of identical bodies 150 are similarly secured to the plate 143 of the mandrel 142 by identical fasteners 148. The bodies 146 and 150 each include upper surfaces 151, 152 which diverge downwardly and outwardly from the plane of the blade members 140 and 141. The blade members 140 and 141 each include substantially identical pointed end portions 153 (FIGURES 10 and 12) which project upwardly beyond the apices (unnumbered) of the bodies 146 and 150.

An identical metallic flexible clip 154 is secured by an identical screw or fastener 155 to each of the bodies 146 and 150, as is clearly illustrated in FIGURES 2, 9 and 11 of the drawings. The clips 154 each include a resilient leg 156 projecting upwardly beyond the lowermost portion of the downwardly diverging surfaces 151, 152 of the bodies 146 and 150.

The mandrel 142 is movable by a mechanism 160 (FIGURES 1 and 2) from a lowermost position (FIGURES 3 through 8) through intermediate positions (FIGURES 9 through 12) toward an uppermost position (FIGURE 13), and thereafter returned to the lower position thereof. The mechanism 160 includes a pair of linkage arms 161 and 162 (FIGURE 2) joined together by a pivot pin 163. The arm 161 is pivotally connected to a support 164 projecting upwardly from the base 101 of the framework 26 by a pivot pin 165. A cam follower or roller 166 (FIGURE 1) is secured to the arm 161 and overlies a camming surface 167 of a cam 168 keyed to the cam shaft 96 adjacent the rod 91, as is best illustrated in FIGURE 1. As the cam shaft 96 rotates, the cam follower 166 follows the cam surface 167 of the cam 168 in an obvious manner to impart pivoting movement to the link 161 about the pivot pin 165. The movement of the arm 161 imparts substantially vertical reciprocation to the arm 162, as can be readily visualized in FIGURE 2 of the drawings.

The arm 162 of the mechanism 160 is formed of two parts (unnumbered) joined by an adjustable turnbuckle mechanism 170 to increase or decrease the length of the arm 162 and thus the length of travel of the mandrel 142, as will become more apparent hereafter. A bifurcated or split yoke 171 is connected by a pivot pin 172 to an ear 173 of a rack 174 which is in turn vertically movable in a guide 175 (FIGURE 2). The horizontal plate 143 of the mandrel 142 (FIGURE 10) is welded or otherwise conventionally secured to a reinforcing member 176 which is in turn welded to a portion of the rack 174 above the ear 173. In this manner the vertical reciprocation of the arm 162 of the mechanism 160 is imparted to the rack 174 and the mandrel 142 to reciprocate the latter between the noted positions.

After the inner side walls I¹, I² of the carton C have been initially spread the distance D (FIGURES 8 and 8A) the mandrel 142 is moved vertically upwardly by the mechanism 160 and the end portions 153 of the "picks" or plate members 140, 141 of the mandrel 142 are partially inserted through openings 177 in the plate 76 (FIGURES 9 and 10) between the inner side walls I¹ and I² of the carton C. During this initial entry of the "picks" 140, 141 (approximately one-half inch), the means 55 are still in grasping engagement with the outer side walls S¹, S² of the carton C and a pressure means or pressure bar 180 (FIGURES 9 and 10) is descending downwardly toward the center fold line F¹ of the carton C and the mandrel 142 is, except for the picks 140, 141, still positioned beneath the plate 76. As the mandrel 142 continues to move upwardly from the position shown in FIGURES 9 and 10 to the position illustrated in FIGURES 11 and 12, the end portions 153 of the picks 140, 141 contact the cross partitions CP of the carton C to accurately position the carton C with respect to the bodies 150 for the subsequent entry thereof between the inner side walls $I^1$, $I^2$ of the carton C, as is best illustrated in FIGURES 11 and 12 of the drawings.

Prior to the entry of the bodies 146 and 150 of the mandrel 142 through the respective openings 177 and 75 to the positions thereof shown in FIGURE 12 between the inner side panels $I^1$ and $I^2$, the grasping means 55 release the outer side walls $S^1$, $S^2$ by the opening of the valve mechanism 65 to atmosphere and the pressure bar 180 moves to the position shown in FIGURES 11 and 12 into bearing contact with the center fold line $F^1$ of the carton C.

The pressure bar 180 is urged to the position shown in FIGURES 11 and 12 of the drawing by an actuating mechanism 182 (FIGURES 1 and 2) which is similar to the mechanism 160 which moves the mandrel 142. The mechanism 182 includes a linkage comprising an arm 183 joined to an arm 184 by a conventional pivot pin 185 (FIGURE 2). The arm 184 is pivotally secured by a pivot pin 186 to the support 164 (FIGURE 2) at the end of the arm 184 remote from the pivot pin 185 and adjacent to the pivot pin 165 of the arm 161. A cam follower or roller 187 is suitably secured to the arm 184 between the pivot pins 185, 186 and is received in an irregularly shaped cam slot or surface 188 of a cam 190 keyed to the cam shaft 96 (FIGURE 2). As is best illustrated in FIGURE 2 of the drawings and readily apparent therefrom, the rotation of the cam shaft 96 imparts rotation to the cam 190 which is in turn imparted by the cam slot 188 through the cam follower 187 to the arm 184 causing pivoting thereof which is in turn transformed into generally rectilinear upward and downward motion of the arm 183.

The arm 183 can be adjusted in length to increase or decrease the throw thereof in much the same manner as the arm 162 is adjusted. The arm 183 also includes an upper bifurcated portion or yoke 191 secured to an ear 192 of a rack 193 by a pivot pin 194. The rack 193 is received in a guideway 195 (FIGURE 1) of the guide 175.

As is best illustrated in FIGURE 1 of the drawings a camming block 196 having a cam surface or slot 197 is secured to the framework 26 above the guide 175. A leg 198 of the pressure bar 180 is secured by a pivot pin 200 (FIGURE 1) to the rack 193 while a cam follower or roller 201 is secured to the leg 198 opposite the pivot pin 200 and is positioned in the cam slot 197 of the cam block 196. As the rack 193 is drawn downwardly from the position shown in FIGURES 1 and 2 of the drawings by the mechanism 182, the pressure bar 180 is initially urged toward and across the generally vertical and downward path of travel of the carton C by the camming action between the cam follower 201 and the cam slot 197 of the cam block 196.

After the pressure bar 180 is in a position substantially normal to the path of carton travel, the continued downward movement of the rack 193 draws the pressure bar 180 downwardly into bearing contact with the central fold line $F^1$ in the manner illustrated in FIGURES 11 and 12 to prevent upward movement of the carton C as the mandrel 142 continues its upward advancement under the actuation thereof by the mechanism 160.

As the mandrel 142 continues to move upwardly (FIGURES 11 and 12) the downwardly diverging surfaces 151 and 152 of the mandrel bodies 146 and 150 bear against the carton C at the intermediate fold lines $L^1$, $L^2$ to cause further separation of the inner side walls $I^1$ and $I^2$ (noting that the grasping means 55 are at this time deactivated). This bearing engagement between the surfaces 151, 152 also causes the upward folding or infolding of the outer side walls $S^1$ and $S^2$ and the entry of the cross partitions CP into an associated one of the slots S, as clearly illustrated in FIGURES 11 and 12.

The continued upward movement of the mandrel 142 brings the resilient legs 156 of the plurality of clips 154 into bearing engagement with the outer side walls $S^1$, $S^2$ of the carton C adjacent the intermediate fold lines $L^1$, $L^2$, as is best illustrated in FIGURE 13. This bearing engagement of the clips 154 against the outer side walls $S^1$, $S^2$ of the carton C causes the inward folding of these walls to a point at which the edges of the slots S remote from the intermediate fold lines $L^1$, $L^2$ overlie and are spaced from an associated one of a plurality of ears E of the cross partitions CP. In this uppermost position of the mandrel 142 (FIGURE 13) the lower portion of each of the side walls $S^1$, $S^2$ is also flexed slightly inwardly by the clips 154.

The mechanism 160 (FIGURE 2) then begins to draw the mandrel 142 downwardly from the position shown in FIGURE 13 to the lowermost position thereof (FIGURE 14). During this downward movement of the mandrel 142, the legs 156 of the plurality of clips 154 gradually release the outer side walls $S^1$, $S^2$ of the carton C, and these outer side walls rebound to the position illustrated in FIGURE 14 with the ears E of the carton C interlocking against outer surfaces (unnumbered) of the outer side walls. At this point, the carton C is fully erected and can be discharged from the carton erecting machine 25 by a discharging or ejector mechanism 210 (FIGURES 1 and 2) upon the release of the carton C by the pressure bar 180. The pressure bar 180 is disengaged by the rising thereof under the influence of the mechanism 182 (FIGURE 1), the path of travel of the pressure bar 180 being illustrated in FIGURE 15 of the drawings during this retracting movement.

The discharge mechanism 210 is best illustrated in FIGURES 1 through 3 of the drawings and includes an ejector arm 211 (FIGURE 1) pivoted at a lowermost end portion thereof to a bracket 212 by a pivot pin 213. The bracket 212 is secured by conventional screws 214 to the framework 26 of the carton erecting machine 25 in a manner clearly illustrated in FIGURE 1.

The upper end portion of the ejector arm 211 is confined between and guided by a pair of straps or guide members 215 (FIGURE 2) secured to the vertical panel 50 by identical conventional fasteners 216. An ejector bar 217 is positively secured in a journal 218 of the arm 211 and projects across and slightly above the upper surface (unnumbered) of the plate 76, as is best illustrated in FIGURE 2 of the drawings. As the ejector arm 211 is pivoted about the pin 213 from right-to-left as viewed in FIGURE 1 of the drawings, the ejector bar 217 follows a path of travel shown in FIGURE 15 to discharge the erected carton C from the machine 25.

Motion is imparted to the ejector arm 211 of the mechanism 210 through an ejector cam 220 (FIGURE 1) carried by the cam shaft 96. The ejector cam 220 has a generally irregular camming surface 221 (FIGURE 15A) acting against a cam follower or pin 222 carried by an end portion of an arm or link 223 pivotally joined at a midportion thereof by a conventional pivot pin 224 to an upstanding support 225 (FIGURE 1) rising from the base 101 of the framework 26. The end of the arm 223 opposite the cam follower 222 is journalled to an eye-bolt 226 of an adjustable turnbuckle linkage or arm 227 by a conventional pivot pin 229. Another eye-bolt 230 at right angles to the eye-bolt 228 is secured by a pivot pin 231 to the ejector arm 211 adjacent and above the pivot 213, as is best illustrated in FIGURE 1. A spring 233 (FIGURE 1) is connected in a conventional manner between the framework 26 and the ejector arm 211 above the pivot pin 231, as is clearly illustrated in FIGURE 1 of the drawing.

When the cam follower 222 (FIGURE 15A) is on the high side of the camming surface 221, the arm 211 is pivoted about the pivot pin 213 to the position shown in FIGURE 1 against the bias of the spring 233. However, as the cam 96 rotates and the cam follower 222 approaches the low side of the ejector cam 220 the spring 233 draws the ejector arm 211 from right-to-left as viewed in FIGURE 1 of the drawings to eject the carton C (FIGURE 15) from the carton erecting machine 25 along the path of travel shown in this figure. The completely erected carton after being discharged from the folding machine 25 is shown in FIGURE 16 of the drawing.

The carton erecting machine 25 of this invention is essentially a single-cycle machine. That is, from the time the machine 25 is started and a single carton is fed by the feed wheel 41 until the time that this carton is discharged from the machine, the various elements thus far described complete a single cycle of operation and the machine automatically stops. The control system for the single-cycle operation of the carton erecting machine 25 is shown in FIGURE 5A of the drawings, and is generally designated by the reference numeral 235.

The control system 235 includes several of the machine elements thus far described, such as the motor 27, the vacuum pump 66, and the clutch 31. A switching cam 236 (FIGURES 5A, 4 and 1) is keyed to the cam shaft 96 and includes a camming surface 237 in contact with a cam follower or roller 238 carried by a switching arm 240 of relay switch 241 (FIGURES 4, 3, and 5A).

The control system 235 is energized over a pair of conductors 245 and 246 from a conventional source of electrical energy. Upon the closing of a main on-off switch 247 the vacuum pump 66 is energized over the conductor 245, the now closed on-off switch 247, a conductor 248, a conductor 250, the vacuum pump 66, a conductor 251, and the conductor 246. The closing of the on-off switch 247 also energizes the motor 27 over the conductor 245, the now closed on-off switch 247, the conductor 248, the motor 27, a conductor 252, and the conductor 246. At this time, the clutch 31 is held in the inoperative or locked position thereof by a projecting armature 253 of a solenoid 254 engaging a detent 255 of the clutch 31. This is the "stop" position of the control system 235 and the machine 25 which is maintained as long as the armature 253 is not withdrawn from its position of contact with the detent 255 under the energization of the solenoid 254.

To disengage the armature 253 and the detent 255 a normally open pushbutton 256 is depressed causing the energizing of a coil 257 of a relay 258 (FIGURE 3) over a circuit traced from the conductor 245, the closed on-off switch 247, a conductor 260, a conductor 261, the now closed pushbutton switch 256, a conductor 262, the coil 257 and the conductor 246. When the coil 257 is energized, a pair of normally open relay contacts 263 and 264 are closed energizing a circuit which energizes the solenoid 254 causing the withdrawal of the armature 253 and the disengagement thereof with the detent 255 of the clutch 31.

The circuit which energizes the solenoid 254 is traced from the conductor 245 through the now closed on-off switch 247, the conductor 260, the now closed relay contact 263, a conductor 265, the solenoid or coil 254, the conductor 266 and the conductor 246. The energization of the solenoid or coil 254 causes the withdrawal of the armature 253 thereof in a well known manner whereby the detent is disengaged and the clutch 31 is free to rotate for a single revolution by the motor 27 through the right-hand drive 28. The cam shaft 96 is rotated to bring the high side of the camming surface 237 of the switching cam 236 into bearing engagement with the cam follower 238 of the switching arm 240 of the switch 241. This closes the normally open switch arm 240 and establishes a holding circuit for the control system 235 upon the release of the pushbutton 256. This holding circuit is traced from the conductor 245 through the closed on-off switch 247, the conductor 260, the now closed switch 240, a conductor 266, the closed relay contact 264, a conductor 267, the solenoid 257, and the conductor 246. Upon the completion of the single cycle of the machine 25 and each of the functions heretofore described, the low side of the camming surface 237 of the cam 236 reaches the cam follower 238 of the switch 240 to open the circuit just traced and de-energize the control system 235 whereby the machine is stopped. It should be noted, however, that by holding the pushbutton 256 continually in its depressed position, the control circuit 235 will be continuously energized and the machine 25 will continue to erect and discharge cartons so long as folded carton assemblies are fed to it.

Another novel carton erecting machine constructed in accordance with this invention is best illustrated in FIGURE 17 of the drawings, and is generally referred to by the reference numeral 325. The carton erecting machine 325 is substantially identical to the carton erecting machine 25 heretofore described and comprises a base or framework 326 which is substantially identical to the framework 26 of the machine 25. The machine 325 also includes elements corresponding identically to the elements 27 through 42 of the machine 25 (not shown) for feeding a folded carton C′ downwardly through an opening or throat 343 in an upper plate 344 of the framework or base 326. A conventional feeder (not shown) but similar to the feeder F of the machine 25 urges a plurality of such cartons C′ from right-to-left as viewed in FIGURE 17 of the drawings, and then downwardly along a generally vertical predetermined path of carton travel.

The carton C′ is fed downwardly between means 355 for contacting and separating the folded carton. The means 355 comprise a pair of substantially identical pivotable members or arms 356 each secured to a shaft 357 journalled in the framework 326 of the erecting machine 325. An identical pulley 358 is connected to each of the shafts 357 and a pulley belt 360 is entrained about each of these pulleys 358 and a pulley 361 conventionally journalled to the framework 326 of the carton erecting machine 325. A gear 362 is carried by the right-hand most of the shafts 357 as viewed in FIGURE 17, and this gear is in mesh with a larger gear 363 keyed to a shaft 364 suitably conventionally journalled to the framework 326.

The gear 363 is rocked in a clockwise direction as viewed in FIGURE 17 by a mechanism 365 to swing the arms 356 about the shafts 357 in a direction of the directional arrows from the solid outline position to the phantom outline position in this figure to unfold outer side walls or partitions S′ and S″ of the carton C′ (FIGURE 21) to the generally planar position shown in FIGURE 22. When the gear 363 is rotated in a counterclockwise directon as viewed in FIGURE 17, the arms 356 return along the same path from the phantom outline position to the solid outline position thereof in FIGURE 17 at the completion of a carton erecting cycle to be described more fully hereafter.

The mechanism 365 includes an arm or link 366 keyed to the shaft 364. A spring 367 is connected between a plate 376 of the framework 326 and the arm 366 to normally urge the arm 366, the shaft 364 and the gear 363 in a clockwise direction as viewed in FIGURE 17. A link 368 is pivotally connected to the arm 366 at a first end portion thereof and to a link 370 at an opposite end portion thereof. The link 370 passes through an opening (unnumbered) in the plate 376 and is guidably received in a guide sleeve 371 secured in a conventional manner to the plate 376. A lowermost end portion of the link 370 beneath the plate 376 is bifurcated and secured by a pivot pin 372 to an elongated linkage or arm 373.

The arm 373 has a bifurcated bottom end portion 374 straddling a cam shaft 396, substantially identical to the cam shaft 96 of the erecting machine 25, suitably conventionally mounted to the framework 326. A roller or cam follower 375 is secured to the arm 373 by a fastening device 377. The cam follower 375 engages a cam surface 378 of a cam 380 secured to the cam shaft 396.

The cam follower 375 is illustrated at the uppermost point of the cam surface 378 in FIGURE 17, and upon the rotation of the cam shaft 396, the arm 373 pivots the arm 366 ina clockwise direction through the links 370 and 368 to swing the arms 356 in the first mentioned direction under the influence of the biasing spring 367. The arms are swung in the reverse direction at the completion of the erecting operation during the movement of the cam follower 375 from the low side of the cam surface 378 to the high side thereof causing an upward movement of the arm 373, a counterclockwise rotation of the gear 363 and the return of the arms 356 to the solid lines positions in this figure.

Prior to the movement of the arms 356 by the mechanism 365 in the manner just described, the carton C' is first fed downwardly and seated upon a mandrel 442 which is substantially identical to the mandrel 142 of the erecting machine 25. The mandrel 442 comprises a horizontal plate 443 from which is directed upwardly a flange 444 carrying an integral sleeve 445 and 446 at opposite ends thereof. Between the sleeves 445 and 446 on opposite sides of the flange 444 are a plurality of identical bodies 447 having downwardly and outwardly diverging surfaces 448, corresponding to the surfaces 151 and 152 of the mandrel 142. An identical "pick" or blade member 450 is secured between the bodies 447 adjacent the sleeve 446 while a substantially identical "pick" or blade member 451 is similarly secured between the bodies 447 adjacent the sleeve 445. An identical clip 452 having an upwardly directed resilient leg 453 is secured to each of the bodies 447 by a conventional screw or similar fastening means 454.

The mandrel 442 is reciprocated between the positions thereof shown in FIGURES 17 and 25 by a mechanism 460 (FIGURE 17) which is substantially identical to the mechanism 160 for actuating the mandrel 142 of the erecting machine 25. The mechanism 460 (FIGURE 17) comprises a pair of linkage arms 461 and 462 joined together by a pivot pin 463. The arm 461 is pivotally connected to a support 464 projecting upwardly from a base 401 of the framework 326 by a pivot pin 465. A cam follower or roller 466 is secured to the arm 461 and overlies a camming surface 467 of a cam 468 keyed to the cam shaft 396. As the cam shaft 396 rotates, the cam follower 466 follows the cam surface 467 of the cam 468 in a manner substantially identical to that heretofore described in the consideration of the mechanism 160 to impart pivoting movement to the link 461 about the pivot pin 465. The movement of the arm 461 imparts substantially vertical reciprocal movement to the arm 462.

The arm 462 of the mechanism 460 is formed of two parts (unnumbered) joined by an adjustable turnbuckle mechanism 470 for increasing or decreasing the length of the arm 462 and thus the length of travel of the mandrel 442. A bifurcated or split yoke 471 is connected by a pivot pin 472 to an ear 473 of a rack 474 which is in turn vertically movable in a guide 475. The horizontal plate 443 of the mandrel 442 is welded or otherwise conventionally secured to a portion of the rack 474 above the ear 473 (not shown). In this manner, the vertical reciprocation of the arm 462 of the mechanism 460 is imparted to the rack 474 and the mandrel 442 to reciprocate the latter between the heretofore noted positions.

After the carton C' has been fed upon and supported by the mandrel 442 in the manner illustrated in FIGURE 17 of the drawing the mandrel 442 begins to descend under the influence of the mechanism 470. During this descent of the mandrel 442 a carton separating mechanism 390 (FIGURES 17-20) initially separates the outer side walls S', S'' and cross partitions CP' of the carton. The mechanism 390 comprises a pair of identical rods 391, 392 having respective offset arms 393 and 394. The rods 391 and 392 are journalled in the respective sleeves 446 and 445 of the mandrel 442, as is best illustrated in FIGURE 20 of the drawings. A crank arm 395 is conventionally secured to a lowermost end portion of the rod 392 projecting beneath the plate 443 of the mandrel 442. A similar crank arm 396 is secured to the portion of the rod 391 projecting beneath the plate 443, and a link 397 is pivotally connected between these crank arms 395, 396 by respective pivot pins 398 and 400.

A crank arm 399 is also conventionally secured to the lowermost portion of the rod 391 projecting beneath the plate 443 of the mandrel 442. This crank arm 399 is substantially longer than the crank arms 395 and 396, and is normally biased to the position shown in FIGURE 18 by a spring 402 connected between the crank arm 399 and the framework 326 by a conventional connector (not shown). A roller or cam follower 403 is carried by the end portion of the crank arm 399, and this roller normally overlies a cam surface 404 of a cam bracket 405 secured to the framework 326 by a pair of conventional fasteners 406, as is best illustrated in FIGURE 17 of the drawings. The cam bracket 405 underlies the plate 376 adjacent an opening 375 therein through which the mandrel 442 is movable by the mechanism 460 in the manner heretofore described.

During the movement of the mandrel 442 from the position shown in FIGURE 17 to that shown in FIGURE 21, the cam follower 403 contacts and rides upon the cam surface 404 of the cam bracket 405 causing a clockwise pivoting of the crank arm 399 as viewed in FIGURES 18 and 19. This clockwise movement of the crank arm 399 is made against the biasing force of the spring 402 and causes a clockwise pivoting of the crank arm 396 and a similar clockwise pivoting of the crank arm 395 by means of the link 397. The crank arms 395 and 396 in turn pivot the respective arms 394 and 393 of the rods 392 and 391 respectively in a clockwise direction causing the movement of the arms from the position of FIGURE 18 to the position shown in FIGURE 19. As the arms move in the direction shown in FIGURE 19 each arm bears against an endmost one of the cross partitions CP' of the carton C', as is best illustrated in FIGURE 19 of the drawings, to urge the outer side walls S' and S'' to the positions illustrated in FIGURES 19 and 21. In this position the outer side walls S' and S'' are folded sufficiently to enable the arms 356 (FIGURE 21) to contact the same and unfold these outer walls to the position illustrated in FIGURE 22.

During the unfolding of the outer side walls S', S'' of the carton C' by the arms 356, a pressure bar 480 moves from the position shown in FIGURE 22 to the position shown in FIGURE 23 into bearing contact with a center fold line F'' of the carton C'.

The pressure bar 480 is urged to the position shown in FIGURE 23 by an actuating mechanism 482 (FIGURE 17) which is similar to the mechanism 460 which moves the mandrel 442. The mechanism 482 includes a linkage comprising an arm 483 joined to an arm 484 by a conventional pivot pin 485. The arm 484 is pivotally secured by a pivot pin 486 to the support 464 at the end of the arm 484 remote from the pivot pin 485 and adjacent to the pivot pin 465 of the arm 461. A cam follower or roller 487 is suitably secured to the arm 484 between the pivot pins 485, 486 and is received in an irregularly shaped cam slot or surface 488 of a cam 490 keyed to the cam shaft 396. The rotation of the cam shaft 396 imparts rotation to the cam 490 which is in turn imparted by the cam slot 488 through the cam follower 487 to the arm 484 causing pivoting thereof which is in turn transformed into generally rectilinear upward and downward motion of the arm 483. The arm 483 can be adjusted in length to increase or decrease the throw thereof in much the same manner as the arm 462 is adjusted. The arm 483 also includes an upper bifurcated portion or yoke 491 secured to an ear 492 of a rack 493 by a pivot pin 494. The rack 493 is received in a guideway 495 of a guide 499 which is substantially identical to the guide 475.

A camming block 496 having a camming surface or slot 497 is secured to the framework 326 above the guide 495, in much the same manner as the relationship between the camming block 196 in the framework 26 of the machine 25. A leg 498 of the pressure bar 480 is secured by a pivot pin 500 to the rack 493 while a cam follower or roller 501 is secured to the leg 498 opposite the pivot pin 500, and is positioned in the cam slot 497 of the cam block 496. As the rack 493 is drawn downwardly from the position shown in FIGURE 17 of the drawings by the mechanism 482, the pressure bar 480 is initially urged toward and across the generally vertical and downward path of travel of the carton C' by the camming action between the cam follower 501 and the cam slot 497 of the cam block 496.

After the pressure bar 480 is in a position substantially normal to the path of carton travel (FIGURE 22), the continued downward movement of the rack 493 draws the pressure bar 480 downwardly into bearing contact with the central fold line F'' in the manner illustrated in FIGURE 23 of the drawings whereby inner walls or panels I³, I⁴ are urged against the downwardly diverging surfaces 448 of the bodies 447 to separate the inner side walls I³, I⁴ beyond the initial separation thereof shown in FIGURES 21 and 22.

The continued downward movement of the pressure bar 480 urges the lower portions of the outer side walls S' and S'' between the legs 453 of the plurality of clips 452 and the sides of the bodies 447, as shown in FIGURE 24. This bearing engagement of the clips 452 against the outer side walls of the carton C' causes the inward folding of these walls to a point at which the edges of slots (S⁴ in FIGURE 19) overlie and are spaced from ears E' of the cross partitions CP' and the lower portions of each of the side walls S', S'' are also flexed slightly inwardly (FIGURE 24).

The mechanism 460 begins to draw the mandrel 442 downwardly from the position shown in FIGURE 24 to the position shown in FIGURE 25. During this downward movement the mandrel 442, the legs 453 of the clips 452 gradually release the outer side walls S', S'' of the carton C', and these outer side walls rebound to the position shown in FIGURE 25 with the ears E' of the carton C' interlocking against outer surfaces (unnumbered) of the outer side walls. At this point, the carton C' is fully erected and is discharged from the carton erecting machine 325 after the pressure bar 480 is withdrawn to the position illustrated in FIGURE 25 by the mechanism 482.

A discharge mechanism 510 is partially illustrated in FIGURE 17 of the drawings and is identical to the discharge mechanism 210 of the machine 25. The discharge mechanism 510 includes an ejector arm 511 pivoted at a lowermost end portion thereof (not shown) to the framework 326 for counterclockwise pivotal movement as viewed in FIGURES 17 and 25 to discharge the carton C' from the machine 325 under the influence of an ejector cam 520 keyed on the cam shaft 396 and a cam follower 522 connected to the arm 511 by a linkage corresponding to that illustrated in FIGURE 15A of the drawings.

From the foregoing, it will be seen that novel and advantageous provisions have been made by carrying out the desired end. However, attention is again directed to the fact that additional variations may be made in this invention without departing from the spirit and scope thereof as defined in the appended claims.

I claim:

1. Apparatus for erecting cartons comprising means for feeding a folded carton along a predetermined path, means for grasping and separating first portions of the carton whereby second portions of the carton are separated and third portions of the carton are repositioned with respect to the first and second portions, means for further separating the second portions and said last-mentioned means being a movable mandrel carrying means for interlockingly engaging the first and third portions of the carton.

2. Apparatus for erecting cartons comprising means for feeding a folded carton along a predetermined path, means for separating first portions of the carton whereby second portions of the carton are separated and third portions of the carton are repositioned with respect to the first and second portions, means for further separating the second portion and said last-mentioned means being a movable mandrel carrying means for interlockingly engaging the first and third portions of the carton.

3. Apparatus for erecting cartons comprising means for feeding a folded carton along a predetermined path, pneumatic means for grasping and separating first portions of the carton whereby second portions of the carton are separated and third portions of the carton are repositioned with respect to the first and second portions, means for further separating the second portion and said last-mentioned means being a movable mandrel carrying means for interlockingly engaging the first and third portions of the carton.

4. Apparatus for erecting cartons comprising means for feeding a folded carton along a predetermined path, vacuum means for grasping and separating first portions of the carton whereby second portions of the carton are separated and third portions of the carton are repositioned with respect to the first and second portions, means for further separating the second portion and said last-mentioned means being a movable mandrel carrying means for interlockingly engaging the first and third portions of the carton.

5. Apparatus for erecting cartons comprising means for feeding a folded carton along a predetermined path, means for grasping and separating first portions of the carton whereby second portions of the carton are separated and third portions of the carton are repositioned with respect to the first and second portions, means for further separating the second portions, said last-mentioned separating means being a movable mandrel, and clip means carried by said movable mandrel for yieldably urging one of the carton portions into interlocking engagement with another of the carton portions.

6. The apparatus as defined in claim 5 wherein said grasping means includes pneumatic means for grasping and separating the first portions.

7. The apparatus as defined in claim 5 wherein said grasping means includes at least a pair of members movable toward each other for grasping the first portion therebetween.

8. A machine for erecting a flat folded carton of the type including inner side panels extending from a center fold line to intermediate fold lines, outer side panels extending from the intermediate fold lines over the inner side panels, the inner and outer side panels containing registering transverse slots and cross partitions hinged in the slots of the inner side panels and lying flat between the inner and outer side panels, the combination comprising means for positioning a folded carton upon a supporting surface, pneumatic means for separating the inner side panels of the carton through engagement with the outer side panels, pivot means carrying said pneumatic means, said pivot means having a pivoting axis disposed below said supporting surface, means for further separating said inner side panels through engagement with said inner side panels, means carried by the further separating means for folding the outer side panels inwardly and interlocking portions of the outer side panels and partitions during the inward folding of the outer side panels.

9. A machine for erecting a flat folded carton of the type including inner side panels extending from a center fold line to intermediate fold lines, outer side panels extending from the intermediate fold lines over the inner side panels, the inner and outer side panels containing registering transverse slots and cross partitions hinged in the slots of the inner side panels and lying flat between the inner and outer side panels, the combination comprising means for separating the inner side panels of the carton through engagement with the carton partitions, means for folding the outer side panels inwardly, and means for interlocking the outer side panels and the partitions.

10. A machine for erecting a flat folded carton of the type including inner side panels extending from a center fold line to intermediate fold lines, outer side panels extending from the intermediate fold lines over the inner side panels, the inner and outer side panels containing registering transverse slots and cross partitions hinged in the slots of the inner side panels and lying flat between the inner and outer side panels, the combination comprising means for feeding a folded carton along a predetermined path in a first direction, pneumatic means for grasping and unfolding said outer side panels whereby said inner side panels are separated, means further separating said inner side panels by movable engagement therewith in a second direction opposite and generally parallel to the first direction, and means carried by said further separating means for interlocking the outer side panels and the partition during the movement of said further separating means in said second direction.

11. The apparatus as defined in claim 10 including means for holding the carton against movement in the second direction during the movement of the further separating means.

12. The apparatus as defined in claim 10 wherein said further separating means is a reciprocal mandrel and the means carried thereby is at least a single clip.

13. Apparatus for erecting cartons comprising means for feeding a folded carton along a predetermined path, guide means for guiding said carton during the movement thereof along said path, means for grasping and separating first portions of the carton whereby second portions of the carton are separated and third portions of the carton are repositioned with respect to the first and second portions, means for further separating the second portions, said last-mentioned means including means for interlockingly engaging the first and third portions of the carton, said guide means including a pair of members straddling said predetermined path, said members having opposing guiding surfaces converging in the direction of carton feed, and at least a third member having a guiding surface substantially spaced from said opposing guiding surfaces.

14. Apparatus for erecting cartons comprising means for feeding a folded carton along a predetermined path, vacuum means for grasping and separating first portions of the carton whereby second portions of the carton are separated and third portions of the carton are repositioned with respect to the first and second portions, moving means carrying said vacuum means, sequencing means for actuating said moving means toward and away from said predetermined path, means for energizing said vacuum means when said moving means is adjacent said predetermined path, mandrel means movable from a direction opposite and generally parallel to the direction of feed along said predetermined path for further separating said second portions, and means for interlockingly engaging the first and third portions of the carton after the moving means have moved away from said predetermined path.

15. Apparatus for erecting cartons comprising means for feeding a folded carton along a predetermined path, vacuum means for grasping and separating first portions of the carton whereby second portions of the carton are separated and third portions of the carton are repositioned with respect to the first and second portions, moving means carrying said vacuum means, sequencing means for actuating said moving means toward and away from said predetermined path, means for energizing said vacuum means when said moving means is adjacent said predetermined path, mandrel means movable from a direction opposite and generally parallel to the direction of feed along said predetermined path and bearable against the second portions of the carton for causing further separation thereof, means for de-energizing said vacuum means approximately during the further separation of the second portion, and means for interlockingly engaging the first and third portions of the carton after moving means have moved away from said predetermined path.

16. The apparatus as defined in claim 15 wherein said interlocking means are a plurality of clip means for bearing against the first portion of the carton adjacent fold lines joining the first and second carton portions.

17. The apparatus as defined in claim 15 wherein said interlocking means are clips carried by said mandrel means.

18. In apparatus for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the improvement comprising means for separating the outer side walls of the carton through engagement with at least one of the cross partitions, and means for interlocking the outer side walls and the cross partitions.

19. In apparatus for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the improvement comprising means for separating the outer side walls of the carton through engagement with at least one of the cross partitions, said means for separating the outer side walls being pivotable means, and means for pivoting said pivotable means toward each other to each bear against at least one of the cross partitions whereby said outer side walls are separated.

20. In apparatus for erecting a flat folded carton of the form which includes inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls, the improvement comprising means for separating the outer side walls of the carton through engagement with at least one of the cross partitions, means for folding the outer side walls outwardly about the intermediate fold lines, means for registering the cross portions and slots, and means for interlocking the outer side walls and the cross partitions.

21. The apparatus asdefined in claim 20 wherein said separating means are a pair of pivotable means, and means for pivoting said pivotable means toward each other and against endmost ones of the cross partition.

22. A mandrel for erecting cartons comprising an elongated body, spaced upstanding plates carried by said body, at least a single pivotable member carried by said mandrel, said pivotable member projecting in the direction of said plates, and said pivotable member having means adapted for engagement with an actuating device for pivoting said member toward said plates.

23. The mandrel as defined in claim 22 including at least a second pivotable member and means coupling said member for pivotal movement in a first direction upon actuation thereof by said actuating device.

24. The mandrel as defined in claim 23 including spring means for biasing said member against movement in said first direction.

25. A method of erecting a flat folded carton having inner side walls extending from a center fold line to intermediate fold lines, outer side walls extending from the intermediate fold lines over the inner side walls, the inner and outer side walls containing registering transverse slots, and cross partitions hinged in the slots of the inner side walls and lying flat between the inner and outer side walls comprising the steps of partially separating the inner side walls of the carton through engagement with said inner side walls, further separating the inner side walls by folding the outer side walls outwardly about the intermediate fold line, folding the carton outer side wall inwardly by applying an inward force to the outer side walls adjacent the intermediate fold lines, and interlocking the outer side walls and the cross partition by removing the inward force.

26. The apparatus as defined in claim 3 wherein said feeding means feed a folded carton in a first direction along said predetermined path, and means are provided for moving said movable mandrel in a direction opposite but parallel to said first direction during the further separating of the second portion and the interlocking engagement of the first and third portions.

References Cited
UNITED STATES PATENTS

| | | | |
|---|---|---|---|
| 2,018,396 | 10/1935 | Burger | 93—37 |
| 2,024,201 | 12/1935 | Benoit et al. | 91—37 |
| 2,699,711 | 1/1955 | Mobley | 93—37 |
| 2,826,967 | 3/1958 | Hatcher | 93—37 |
| 3,049,060 | 8/1962 | Vahle | 93—37 |
| 3,162,099 | 12/1964 | Currie et al. | 93—37 |

WILLIAM W. DYER, JR., *Primary Examiner.*

JAMES M. MEISTER, *Examiner.*